March 28, 1950      I. D. WALLACH      2,502,239
ELECTRIC FOOD MIXER OR THE LIKE
Filed Dec. 6, 1947      3 Sheets-Sheet 1
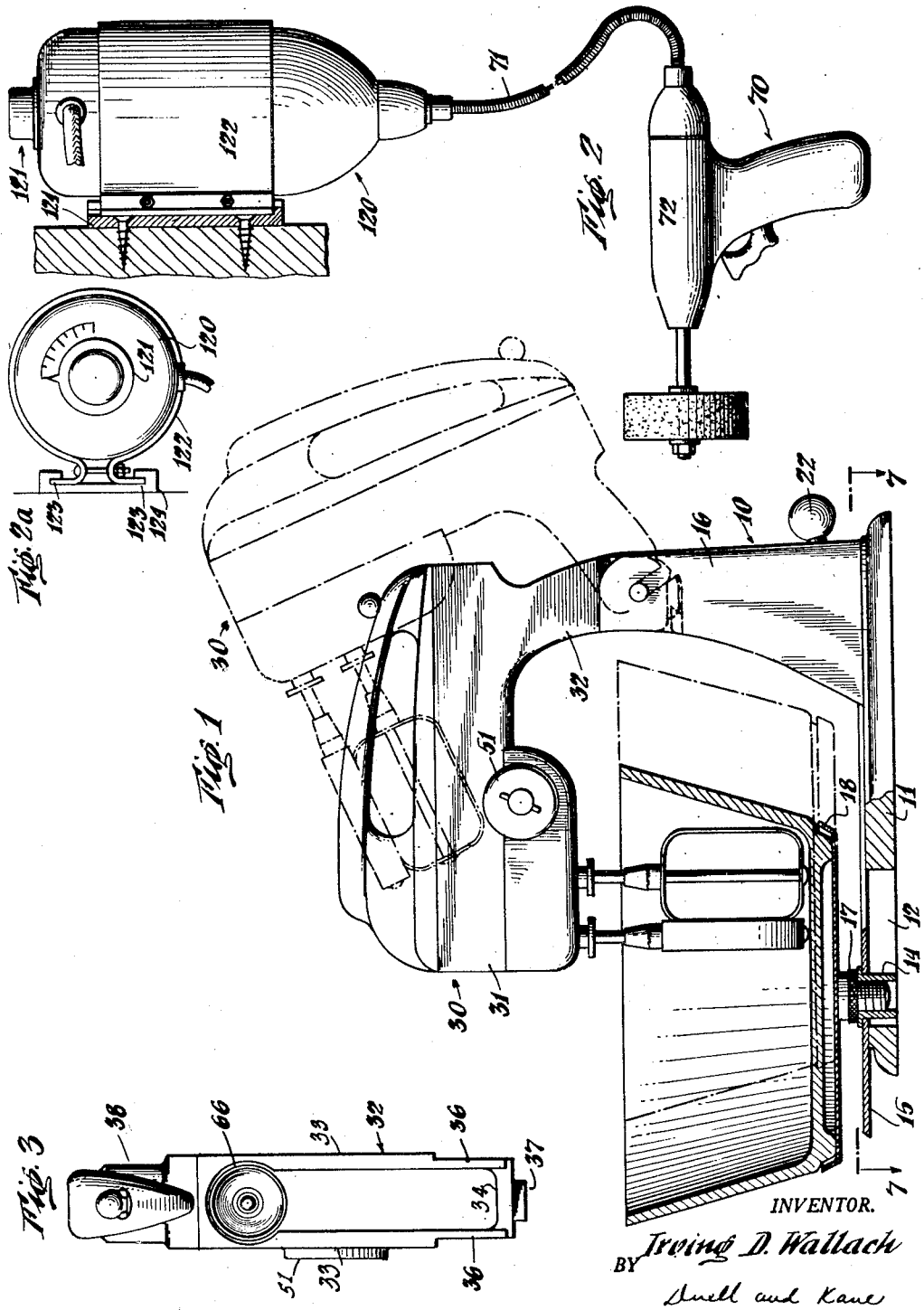
INVENTOR.
Irving D. Wallach
ATTORNEYS

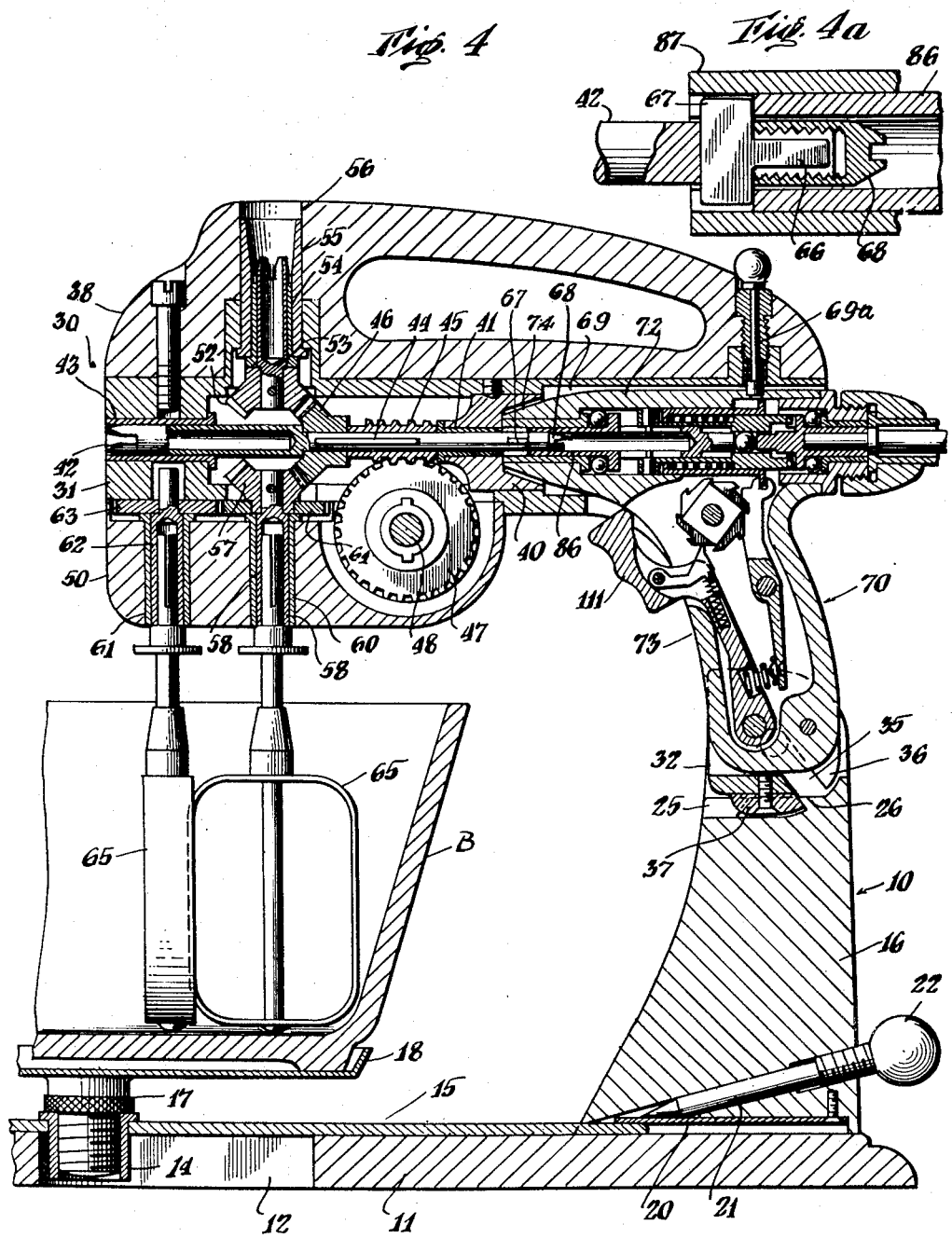

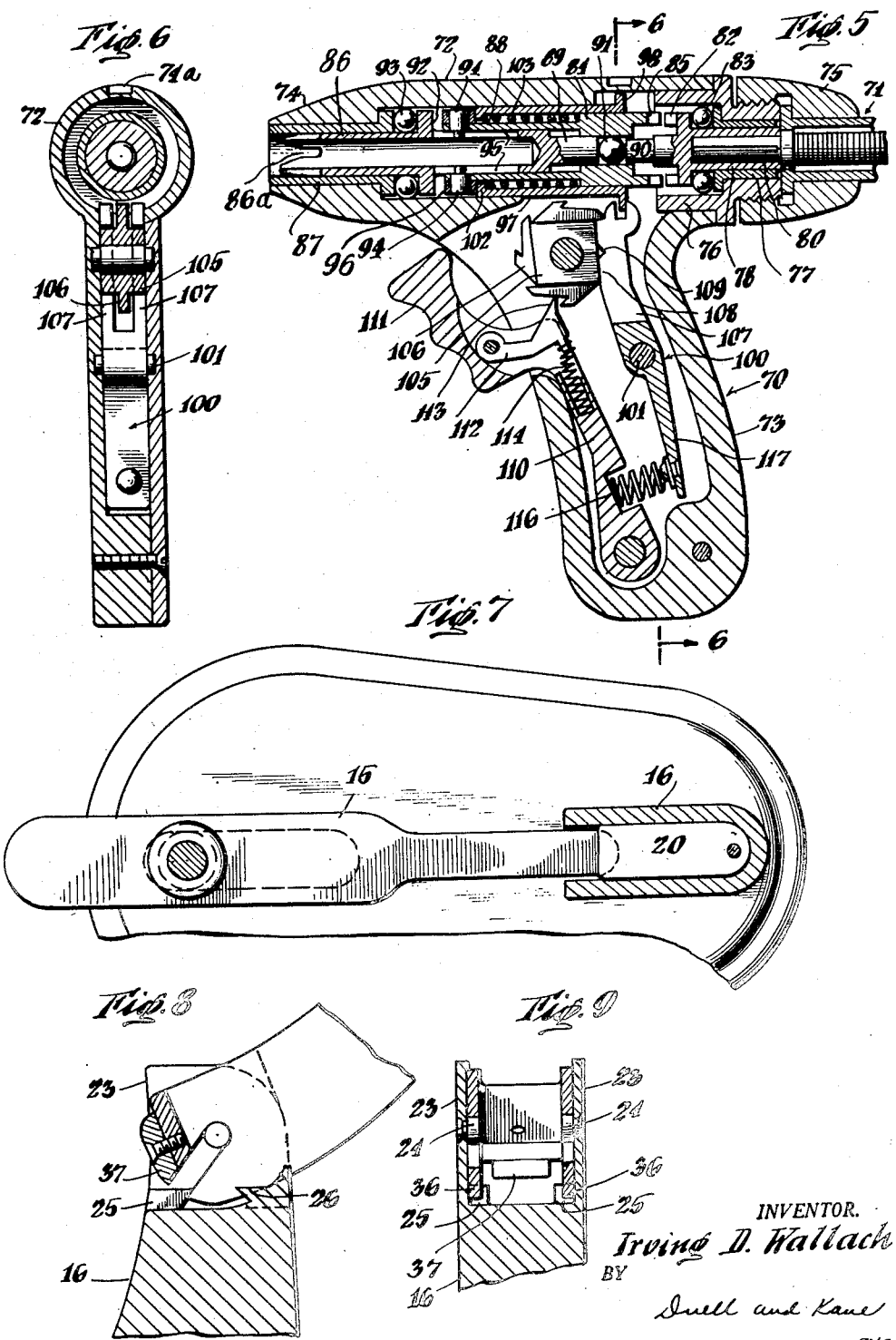

Patented Mar. 28, 1950

2,502,239

UNITED STATES PATENT OFFICE 2,502,239

ELECTRIC FOOD MIXER OR THE LIKE

Irving D. Wallach, Port Washington, N. Y., assignor to Associated Development and Research Corporation, New York, N. Y., a corporation of New York Application December 6, 1947, Serial No. 790,157

4 Claims. (Cl. 74—16)

This invention relates to an improved power driven tool for domestic or culinary use.

Although the invention is not limited to such use, it is expected that it will find great utility as a domestic appliance having means for mixing and beating foodstuffs, chopping and grinding meats and the like, and scouring and polishing. Devices of this general class, are, of course, well known. Presently, however, such appliances include a motor which is a part of the attachment head to which the various accessory tools are affixed; and to provide portability to make it possible, for example, to mix or beat materials while they are cooking, the motor and attachment head unit is removably supported upon a stand or base. The motors of such units, are, of course, relatively heavy, and it is tiring to hold and use the appliance when it has been detached from its stand. Such provisions as are made for attaching a scouring brush or the like are impractical because the units are clumsy and difficult to manipulate effectively.

The present invention provides a truly portable tool in which the motor is independently supported remote from the attachment head. A novel power transmission unit driven by the motor is removably affixed to the attachment head to drive the main shaft thereof; and said power transmission unit is itself adapted to receive and operate scouring brushes, beaters or the like, when removed from the attachment head.

When the apparatus is to be used for mixing, meat chopping, etc. the power transmission unit is placed in driving relation to the tool attachment head, which is mounted on a base fixture, and the apparatus is used in conventional fashion. If it is necessary to mix or beat viscous foodstuffs cooking on the stove, or being cooled in a cold water bath for example, the tool attachment head with beaters affixed and the power unit in position may be removed from its supporting standard and taken to the stove or sink; the motor remains in its mounting fixture or may be removed therefrom and placed on a table or other surface adjacent the work. The user is therefore not burdened with the weight of the motor. On the other hand, if thin sauces or the like are to be stirred, pots scoured, or silverware buffed, the power transmission unit may be removed from the tool attachment head, the appropriate tool fitted, and the task completed as desired.

It is therefore an object of the invention to provide a power driven tool having portability and adaptability not present in contemporary devices of the type.

It is another object of the invention to provide a power driven tool in which a power transmission unit is removably associated with a tool attachment head to drive the same, said unit, when removed from the attachment head, being itself adaptable to receive and drive tools.

It is a further object of the invention to provide a domestic appliance in which beaters, buffing wheels and other accessories may be mounted for operation in an attachment head supported on a base structure, or optionally may be mounted for operation in a power transmission unit removable from said attachment head.

It is yet another object of the invention to provide a food mixer or the like, having improved means for supporting a bowl and for adjusting said bowl relative to the mixing tools.

Other features and advantages of this invention will be apparent from the following detailed description thereof and reference to the accompanying drawings in which Fig. 1 is a side elevation, partly in section, of the tool attachment head on its supporting column, and showing in dotted line the rearwardly swung position of said head. In Fig. 1 the power transmission unit has been detached.

Fig. 2 is a side elevation showing the power transmission unit and the independently supported drive motor, said unit having affixed thereto a tool representing a buffing wheel, scouring brush or the like.

Fig. 2a is an end elevation of the motor, looking in the direction of the switch and speed control means thereof.

Fig. 3 is an end elevation of the attachment head.

Fig. 4 is a vertical sectional elevation of the tool attachment head of Fig. 1, the power transmission unit being in operative position therein.

Fig. 4a is a detail, in section, showing the manner of affixing a drive key to the attachment head main shaft.

Fig. 5 is a side sectional elevation of the power transmission unit, the clutch being disengaged.

Fig. 6 is an end sectional elevation of the said unit taken on lines 6—6 of Fig. 5.

Fig. 7 is a plan view of the base of the supporting stand, with the column thereof in section, and disclosing the lateral turntable adjustment means.

Fig. 8 is a vertical sectional detail showing the mounting of the tool attachment head upon the base column, and Fig. 9 is a vertical sectional elevation looking in the direction of the arrows 9—9 of Fig. 8.

Referring to the drawings, a presently preferred embodiment of my invention comprises a base 10 on which is removably and swingably mounted an attachment head 30. Removably associated with said attachment head is a power transmission unit 70 connected by means of flexible drive shaft 71 with a motor 120.

The base 10 has a platform 11 provided with an elongate slot 12 within which rides a female-threaded sleeve 14 carried by a slide 15, an end of which (see Fig. 7) slidably extends into a suitable pocket provided in the column 16 fixed to base 10. Sleeve 14 receives a stud 17 on which a turntable 18 is rotatably supported.

Referring now to Fig. 4 it is seen that an end of slide 15 extends beneath a clamp plate 20, one end of which is affixed to the column 16. The said column is angularly bored to receive in screw-threaded relationship a clamping bar 21, a rounded or tapered end of which engages with the end of the clamp plate 20. Clamp bar 21 terminates in an externally accessible knob 22 and it will be apparent that when said knob is rotated to retract pin 21 relative to the column 16, pressure upon plate 20 is relaxed and the slide 15 can be moved to the right or left of Fig. 4 within the limits of slot 12. After adjustment of the slide 15 the clamp bar 21 is again tightened to cause the plate 20 frictionally to engage the top of the slide 15 to secure the same in its new position. Slide 15 therefore makes it possible to adjust turntable 18 and the bowl B carried thereon with respect to the column so as to position the contents of the bowl in the most advantageous position for beating or mixing. The angle of engagement of bar 21 with plate 20 provides a very strong clamping pressure.

As shown in Fig. 9 the upper end of column 16 has spaced side walls 23, 23 affixed to which are the aligned pivot studs 24, 24. At the base of said spaced side walls, and extending inwardly from the forward wall there are abutments 25 and extending from the rear wall of said column (see Fig. 8) and disposed centrally of the abutments 25, 25, is a third abutment 26.

The tool attachment head 30 has a body or housing 31 extending from an end of which is a standard 32. Said standard has spaced side walls 33 (see Fig. 3) which with the base wall 34 define a completely open passage which removably receives the unit 70 as later described. As shown in Fig. 3 the lower portions of the side walls 33 are inwardly offset to fit between the spaced walls 23 of the column 16 (see Fig. 9) and said lower side walls are each provided with an open-ended angular slot 35 for cooperation with a pivot stud 24. The base of said standard 32 has shoulders 36 extending downwardly therefrom, and said shoulders engage with the abutments 25 when the standard is rotated clockwise of Fig. 4 so as to support said standard and the thereon carried attachment head 30 in the angular position indicated in Fig. 1. It will be understood that the amount of clockwise rotation permitted by the cooperating members 36 and 25 is sufficient to permit the shifted center of gravity of the attachment head 30 to maintain the same stably in said angular position. Standard 32 also has, integral therewith or affixed thereto, an abutment 37 which engages with shoulder 26 to support the attachment head 30 in the Fig 4 position, in which the longitudinal center line of said attachment head is in horizontal position.

A handle 38 is suitably affixed to the housing 31 of the attachment head. By rotating the attachment head rearwardly until the notches 35 are in a substantially vertical position the entire attachment head may be lifted out of engagement with the column 16. Conversely the head may be restored to the columns by engaging the notches 35 with the studs 24, dropping the attachment head until the studs fit within the notches 35 and then rotating the head either rearwardly until its shoulders 36 engage with the abutment 25 or forwardly until abutment 37 engages with the member 26 of column 16.

It will be seen from Fig. 4 that housing 31 of attachment head 30 is hollow and is provided with a spacer member 40 non-rotatably affixed therein. Said spacer receives a bearing 41 for the main shaft 42, there being an aligned bearing sleeve 43 at the opposite end of housing 31. Suitably secured upon shaft 42 as by a spline 44, are a worm gear 45 and a bevel gear 46. The worm gear drivingly engages a gear 47 suitably carried on a transverse shaft 48 journalled in gear box 50 affixed to the housing 31; said transverse shaft 48 provides a side power take-off point, (see Fig. 1) to which a meat grinder or chopper, not shown, or other high-torque demand accessory may be attached.

Gear 46 is in continuous mesh with a gear 52 suitably secured to the end of a vertical shaft 53 which is journalled in a bearing sleeve 54 fixed within a support bushing 55 disposed within the vertical passage 56 provided in handle 38. Said gear 46 is also in continuous engagement with a gear 57 fixed to shaft 58 journalled in a bearing 60 in gear box 50. A bearing sleeve 61 also affixed within gear box 50 supports shaft 62 which carries a pinion 63 engaging a pinion 64 driven by gear 57. It is apparent that main shaft 42 drives the respective shafts 48, 53, 58, and 62. Gear or speed ratios may be as necessary or desirable.

The tubular ends of shafts 42, 53, 58, and 62 constitute sockets within which are keyed and frictionally held the shafts or shanks of accessory tools such as the beaters 65 shown in Fig. 4. Obviously separate sockets or other tool-attachment means may be utilized. The shaft 53 is primarily for a fruit reamer, a juicing bowl (not shown) being adapted for support in bushing 55. Shaft 42 will operate a grinding wheel, buffer, or the like, (not shown). Beaters 65 are power driven and may be applied at the most advantageous position within the bowl B by shifting said bowl relative to the column 16, or raising the turntable by partially unscrewing stud 17.

As shown in Fig. 4a, an end of shaft 42 is necked down and externally threaded, and is diametrically slotted to receive a flat key 66 having ears 67. An elongate nut 68 threads onto shaft 42 to secure key 66 in place. The outside diameter of nut 68 is equal to the main diameter of shaft 42, and shaft 86 of power unit 70 telescopes thereon to engage ears 67 as later described.

Power transmission unit 70 (see Figs. 5 and 6) has a substantially cylindrical barrel portion 72 which fits relatively snugly within the suitably shaped socket 69 at the end of the body member 31 of attachment unit 30. The tapering end 74 of said barrel seats within the socket provided in the spacer 40 and the pistol grip handle 73 fits snugly between the spaced side walls 33. The unit 70 is removably locked in housing 31 by means such as the spring pressed plunger 69a which engages within a hole or notch 74a in the barrel portion 72. It will be noted that the tapering end 74 of said barrel will cam the plunger upwardly as the unit 70 is inserted within the housing 31, but that it is necessary manually to raise the plunger 69a when it is desired to remove the unit from the housing.

The unit 70 comprises the means for transmitting power to shaft 42. Although it is not necessary for the unit to include clutch means, because the motor 120 has a starting and speed control switch, great practical advantages result when the unit is clutch-equipped so that the operation of the accessory tools may be controlled independently of the motor.

The sheath of drive cable 71 has a flanged end as shown in Fig. 5 and is clamped by nut 75 to a fitting 76 secured within barrel portion 72. Said fitting carries a bearing bushing 77 within which rotates the male clutch element 78, the socket portion of which drivingly receives the splined or otherwise suitably shaped end 80 of the flexible drive shaft. Clutch member 78 has a suitable plurality of clutch jaws 82. Preferably there is interposed between the rear face of the clutch jaw member and a flanged end of the bushing 78 a suitable thrust bearing 83. The female clutch jaw 84 has sockets 85 for cooperation with the projections 82 of the clutch member 78. The driven shaft 86 is journalled in the bearing bushing 87 and projects within the barrel 88 of clutch member 84. Shaft 86 is socketed and has a plurality of diametric slots 86a to drivingly engage the ears of key 66 on shaft 42 as unit 70 is inserted into housing 31; as shown shaft 86 fits over nut 68. A ball 91 provides a thrust bearing between the cylindrical ends 89 and 90 respectively of shafts 86 and 81. Shaft 86 is provided with a flange 92 between which and the flanged end of bushing 87 is a thrust bearing 93. It will be seen, therefore, that shaft 86 is held against movement to the right of Fig. 5 by the abutment of ball 91 against projection 90 of shaft 81, and is held against movement to the left of Fig. 5 by the ball bearing 93. One end of the clutch member 84 is arranged to receive the drive pins 94 the reduced diameter ends of which ride within slots 95 formed in the wall of shaft 86. A ring 96 having radial openings to freely receive pins 94 is secured to clutch member 88 to afford suitable support for the pins.

Rotatably carried within the barrel 72 is a sleeve 97 within which the clutch member 84 fits slidably. Sleeve 97 has a flange 98 which rides freely within the slotted end portions of clutch shift lever 100, said lever being pivoted as at 101 within the handle 73 of the unit. An end of sleeve 97 is inwardly turned to provide a pocket within which is contained a coil spring 103, the opposite end of which bears against a shoulder provided on clutch member 84 as clearly appears in Fig. 5. It will be noted that said inturned end 102 bears against drive pin retainer 96.

Within the handle 73 there is rotatably mounted a square cam 105, the central portion of which comprises an eight-toothed ratchet 106. It will be noted from Figs. 5 and 6 that lever 100 is forked to provide two arms, 107, between which the ratchet 106 is contained. Each of the arms 107 has a flat area 108 intermediate the ends of which is a shallow notch 109 within which the respective corners of the cam 105 seat when the cam is rotated to cause the clutch members to engage. Pivotally supported within the handle 73 near the base thereof is a trigger lever 110 which has a fingerpiece 111 projecting through a suitable opening in the side wall of the handle 73. The fingerpiece is arranged to pivotally receive a pawl 112 the end 113 of which is in operative relationship to the teeth of ratchet 106. A spring 114 seated within a suitable pocket provided in lever 110 and engaging an extension provided on pawl 112 urges said pawl in counterclockwise direction so that its driving end rests normally on the surface of the ratchet suitably intermediate the teeth thereof.

A relatively strong coil spring 116 seats within a pocket provided in the lower end of lever 110 and engages with a suitable projection secured to or formed on the lower leg 117 of lever 100. The reaction of spring 116 urges lever 110 counterclockwise until its wall seats against the inner wall of the handle 73. Spring 116 also urges lever 100 into counterclockwise rotation.

In Fig. 5 it will be noted that the clutch members are disengaged. The operator grasps the handle 73 as he would a pistol and by finger squeeze against the fingerpiece 111 rotates lever 110 clockwise until the end of pawl 112 engages with a tooth of ratchet 106, whereupon the counterclockwise rotation of cam 105 induces a clockwise rotation of lever 100. Spring 116 is at this time being compressed and as the square corner of cam 105 comes into registry with notch 109 the reaction of spring 116 causes notch 109 to smartly engage the corner of the cam, said notch therefore functioning as a detent. The engagement of the forked end of the respective arms 107 with the flange 98 of sleeve 97 results in a movement of said sleeve to the right of Fig. 5 and the compression of spring 103 resulting therefrom induces movement of clutch member 84 to the right until at the stage wherein a corner of cam 105 is seated within the notch 109 the respective clutch members 84 and 78 are in engagement and (assuming the motor to be in operation) the shaft 86 is driven. At this stage it is preferable that the flange 102 be just out of contact with the surface of the pin support ring 96. When the unit is to be declutched pressure is again applied to fingerpiece 111 whereupon the cam is rotated through 45° and the reaction of spring 116 brings the lever arms 107 smartly into contact with the flat of cam 105 and of course drives the sleeve 97 to the left of Fig. 5. The end 102 of sleeve 97 engages with the side of the pin ring 96 and moves clutch member 84 out of engagement with member 78.

It will be noted from Fig. 4 that the dimensions of the handle 73 and the standard 32 are such that when the unit 70 is within the attachment head the fingerpiece 111 projects beyond the wall of standard 32 and is completely accessible for operation by the user in the manner above described.

When unit 70 is in position its tubular shaft 86 drivingly engages the end of shaft 42 and power is therefore transmitted through the illustrated gearing to the respective attachment devices.

The motor 120 is provided with a conventional switch and speed control device 121 whereby the speed best suited for proper operation of a particular tool may be selected by the user. Said motor is also provided with a body part or clamp 122 formed with the base members 123 as shown in Fig. 2a. Said base members may engage with the side walls of a wall mounted bracket 124 or may themselves serve to support the motor when the same is removed from the bracket and placed on a table or counter.

Except for the meat grinder, all of the tools or attachments useful with the tool attachment head 30 may be inserted into the tubular end of the shaft 86 of the unit 70 upon removal of such unit from the attachment head. For example, one of the beaters 65 may be inserted within shaft 86 and the device used to mix or whip foodstuffs while they are cooking on the stove. If the location of bracket 124 is beyond the reach of the flexible drive cable 71 the motor may be removed from its bracket and placed conveniently close to the work. A buffing wheel or grinding wheel which may be associated with shaft 42 is equally adapted for association with shaft 86 when portability is required.

It will be understood that the device is not restricted to domestic use. For example, a suitable drill chuck (not shown) may be inserted into shaft 86, whereupon the unit 70 may be employed as a power drill; said unit and attached motor 120 may be used in the machine shop or garage for example, independent of the attachment head 30.

Thus, among others, the several objects of the invention as afore-noted are achieved. Obviously numerous changes in construction and rearrangement of the parts might be resorted to without departing from the spirit of the invention as defined by the claims.

I claim:

1. In a domestic food mixer and the like the combination of an attachment head having a main shaft and auxiliary shafts driven thereby, said shafts having means to receive and drive accessory tools; a power transmission unit having a barrel portion and handle means extending therefrom, said attachment head having a housing portion to removably receive said transmission unit therein; a clutch in said barrel portion; clutch actuator means in said handle means; a shaft in said barrel portion and mechanically connected with one element of said clutch, said shaft, when the transmission unit is within said housing portion, engaging with said main shaft to drive the same; a motor; and a flexible drive cable connecting said motor and another element of said clutch means, whereby the shaft of said transmission unit may be driven by, or disengaged from, said flexible shaft by actuation of said clutch; said transmission unit, when removed from said housing being itself adapted to receive and drive an accessory tool.

2. In a domestic food mixer and the like, the combination of an attachment head having a main shaft and auxiliary shafts driven thereby, said shafts having means to receive and drive accessory tools, said head having a housing portion provided with a relatively large socket in axial alignment with said main shaft; a power transmission unit having a barrel portion insertable into said socket and a handle portion extending angularly with respect to said barrel portion, a clutch in said barrel portion and including elements movable into and out of engagement with each other; a shaft connected to one of said elements and engageable, when said unit is in position within said socket, with the main shaft of said attachment head to drive said shaft; a motor; a flexible drive shaft connecting said motor and another of said clutch elements; and means disposed within said handle and having actuator means accessible externally thereof to operate said clutch; said transmission unit being itself constructed to receive and drive an accessory tool when removed from the socket of said housing.

3. In a domestic food mixer or the like, a base having a column extending upwardly therefrom; an attachment head having a main shaft and auxiliary shafts driven thereby, said shafts having means to drive accessory tools, said head having a housing portion and a standard extending angularly therefrom, said housing portion and said standard formed to provide an open-ended socket; means on said standard for releasable securement to said column to support said attachment head relative to said base; a power transmission unit having a barrel portion and a handle portion extending therefrom, said portions fitting into the socket provided by the housing and standard of said attachment head, said transmission unit being removable from said socket; a clutch in said barrel portion and including elements movable into and out of engagement with each other; a shaft in said barrel portion connected to one of said clutch elements and engageable, when said unit is in position within said attachment head, with the main shaft thereof to drive said shaft; a motor; a flexible shaft connecting said motor and another of said clutch element; and means disposed within said handle and having actuator means accessible externally thereof, and externally of said attachment head standard, to operate said clutch; said attachment head having handle means by which the head may be held when removed from the supporting column.

4. In a domestic food mixer and the like, the combination of an attachment head having a main shaft and auxiliary shafts driven thereby, said auxiliary shafts having socketed end portions to receive the shaft portions of accessory tools, said attachment head including a housing portion having an open ended socket; a power transmission unit adapted to fit within said socket and having a shaft engageable with said main shaft in telescoping relation therewith to drive the same; a spring-biased latch means engageable with a pocket provided on said transmission unit to secure the same within said socket, said unit having a sloping end portion engageable with an end of said latch means to move the same into position to drop within said pocket upon insertion of said unit into said housing; a motor; a flexible shaft connecting said motor and said transmission unit shaft to drive the same; a bracket for mounting said motor; and means on said motor engageable with said bracket to releasably hold the same thereon, said last named means affording a stable base for said motor when removed from said bracket.

IRVING D. WALLACH.

REFERENCES CITED

The following references are of record in the file of this patent:

UNITED STATES PATENTS

| Number | Name | Date |
|---|---|---|
| 1,094,442 | Hoerr | Apr. 28, 1914 |
| 1,879,004 | Altorfer | Sept. 27, 1932 |
| 1,975,949 | Jeppsson | Oct. 9, 1934 |
| 2,372,862 | Strauss et al. | Apr. 3, 1945 |
| 2,381,770 | Overly | Aug. 7, 1945 |
| 2,390,742 | Setterlund | Dec. 11, 1945 |
| 2,427,099 | Kennedy | Sept. 9, 1947 |
| 2,438,465 | Strauss et al. | Mar. 23, 1948 |

FOREIGN PATENTS

| Number | Country | Date |
|---|---|---|
| 47,557 | Switzerland | Mar. 27, 1909 |